Patented Apr. 9, 1929.

1,708,111

UNITED STATES PATENT OFFICE.

HARLAN L. TRUMBULL, OF AKRON, OHIO, ASSIGNOR TO THE B. F. GOODRICH COMPANY, OF NEW YORK, N. Y., A CORPORATION OF NEW YORK.

FIBER COMPOSITION AND METHOD OF MAKING THE SAME.

No Drawing. Application filed August 25, 1924. Serial No. 734,073.

My invention relates to fiber compositions and particularly to a bound-fiber composition having distinctly new characteristics and adapted for use in the formation of board or sheet material and of articles of various shapes.

A primary object of my invention is to provide new compositions having the general characteristics of vulcanized fiber but superior in their physical properties, such as tensile and dielectric strength, absence of water absorption etc., and which are in addition suitable for many uses for which present fiber compositions are not adapted.

A further object is to provide a suitable method for producing these new compositions, such method in its preferred form comprising the intimate admixture in water of minute particles of hard thermo-plastic substances with beaten fiber, followed by blowing or other mode of transfer of the pulp onto a screen in a layer of regulable thickness, said layer then being dried and removed for use or for further treatment to give it greater compactness and strength.

In one embodiment of my invention, a friable thermo-plastic substance is ground in water to such fineness that all particles may pass through a 200-mesh screen. A wood or other fiber, such as commercial-sulphite wood pulp, is beaten into water, as in a paper beater or other suitable machine, and the ground thermoplastic and fiber intimately intermixed in water. The thermoplastic and fiber pulp may be comminuted together in a paper beater, or they may be comminuted separately and then mixed either in the paper beater employed in making the beaten pulp, or in another suitable mixing device. In any case, the resultant mixture is characterized by a fairly complete separation of the individual fibers by water containing the comminuted thermoplastic. The pulp-thermoplastic mixture in this condition is then sheeted out on a screen, as for example by means of a Fourdrinier machine, or blown by an air gun onto a screen shaped in the form of the finished article, for example, in a manner known as the Drake process. The sheeted or formed material is dried and is preferably subjected to heat and pressure to cause a flowing of the thermoplastic material in the interstices between the fibers. The fluxing of the thermoplastic by heat also permits the individual fibers to move with respect to each other under the influence of pressure by reason of separation of the fibers by the thermoplastic which acts in its fluxed condition as a lubricant between contiguous fibers. A firm, strong and compact fiber composition sheet or article is thus formed.

A product of superior quality may be produced in a manner similar to that above described by first treating the thermoplastic so as to form a water dispersion or a colloidal solution thereof. This may be effected in a colloid mill, the ultimate particle within the aqueous phase having the hard and brittle characteristics of the thermoplastic from which it was produced. The colloidally dispersed thermoplastic is intimately mixed with well beaten fiber, then screened, dried, and heat-pressed in any suitable manner, the resulting product is denser, firmer and more homogeneous than the product above first described.

A wide variety of thermoplastic substances may be employed in the above indicated process, an essential characteristic of such thermoplastics, however, being their capacity for binding fibers and their capability of being ground or comminuted in water to a fine ultimate particle, or of being dispersed in water to form a colloidal solution. I find that certain, hard, friable, thermoplastic derivatives of rubber, more or less shellac-like in their physical properties, and hereinafter more fully described, are particularly adapted for the process and compositions which form the subject-matter of the present application, by reason of their ready grindability and of the unusually strong bond existing between fiber and these thermoplastics which would indicate that a peculiar interfacial relation exists between the two.

It is desirable in the production of these fiber-compositions for certain purposes to employ ingredients which modify the heat plasticity of the thermoplastic, particularly when shellac-like thermoplastics are employed, and which ingredients may herein, for brevity and convenience of expression, be termed softeners. Substances of this character include oils, waxes, bitumens, paracumarone, resins, resinates, rubber latex, and other similar materials.

Where friable softeners are to be used, such as hard waxes or hard bitumens, or the like, they may be either comminuted in water with the thermoplastic, in some cases having been first fluxed therewith, or separately comminuted in water and mixed with the comminuted thermoplastic prior to admixture with the beaten fiber. Or, if desired, the separately comminuted ingredients may be mixed into the beaten fiber without such prior admixture. Non-friable softeners are preferably added to the beaten fibers and beaten therewith, but oils and other liquids may be added either to the beaten fibers or to the comminuted thermoplastic. In some cases, however, liquid softeners are preferably added to the water dispersion or colloidal solution of the thermoplastic, particularly when the suspension of the particles in the admixture is thereby rendered more stable than that of the water dispersion.

The shellac-like, heat-plastic derivatives of rubber which I prefer to use in carrying out my invention are prepared by reacting rubber with a sulfonic compound containing the grouping R—$SO_2$—X, in which R represents an organic radical or a hydroxy group and X represents a hydroxy group or chlorine. By way of example, proceed as follows: Mix into 100 parts by weight of raw rubber an admixture of 8 parts of p-toluene sulfonic acid, 2 parts of sulfuric acid (sp. gr. 1.84) and 2 parts of water, the latter ingredients being previously stirred together, and heat the rubber compound in a compact mass for 8 hours at 140° C. Upon cooling there is obtained a readily grindable product which softens at a relatively low temperature. Alternatively, for the described combination of p-toluene sulfonic acid and sulfuric acid in the above formula, I may substitute, either with or without the presence of a small amount of water, any of the following, (a) p-toluene sulfonyl chloride—11 parts, sulfuric acid—2 parts; (b) p-toluene sulfonyl chloride—9 parts, p-toluene sulfonic acid—2 parts; (c) p-toluene sulfonyl chloride—2 parts, p-toluene sulfonic acid—12 parts; (d) p-phenol sulfonic acid—11 parts, sulfuric acid—2 parts; (e) p-toluene sulfonyl chloride—12 parts; (f) p-toluene sulfonic acid—13 parts, or (g) p-phenol sulfonic acid—15 parts. I do not herein claim, as such, these specific heat-plastic substances or their described mode of preparation.

Heat-plastic derivatives of rubber made by the above indicated process, or otherwise prepared, whether under modified conditions with the above indicated reagents or with reagents not herein mentioned, which are readily grindable and soften at relatively low temperatures, that is, not substantially in excess of 100° C., are intended to be included herein under the generic designation, shellac-like derivatives of rubber, they being similar to shellac in several of their physical properties, such as hardness, friability, low melting point, etc., although chemically different and superior in mechanical strength, affinity for fiber and other characteristics. The term "derivative of rubber" as herein employed does not, however, include "vulcanized rubber," that is, rubber treated with sulfur at normal or elevated temperatures.

*Example I.*—By the way of an example of the preparation of a fiber composition typical of the present invention, I beat the dry spruce sulphite pulp of commerce, 80 parts by weight, into water in a paper beater until the fibers are thoroughly separated and surrounded by a liquid film, and then add thereto 20 parts by weight of a shellac-like derivative of rubber which has been previously comminuted in water to such fineness that all particles can pass through a 200-mesh screen. The two are intimately mixed, as in the paper beater, sheeted on a screen, dried, and compacted under heat and pressure, as for example, in a heated mold which should preferably be cooled before the pressure is relieved.

I have found that in making the fiber composition product on a commercial scale, the admixed pulp and shellac-like rubber derivative may be sheeted and dried in a paper making machine. From this stock the final fiber-composition article may be formed by plying up as many sheets of approximate size as may be needed to secure the desired thickness and then compacting the laminated structure by heat and pressure. A strong, firm and durable article results. Alternatively, the watery admixture of pulp and rubber derivative may be sprayed by means of an air gun onto a screen having portions formed to the shape of the desired resulting product until a desired thickness of the article has been built up, the formed article dried and subjected to heat and pressure to compact the fibres and the heat-plastic binder.

*Example II.*—As another example of the preparation of my fiber composition, I take 30 parts of a shellac-like derivative of rubber and treat in a colloid mill to effect a colloidal dispersion of the rubber derivative. The latter is added to 70 parts of the dry sulphite pulp of commerce which has been comminuted and beaten into water to form a smooth aqueous batter, and the two are thoroughly admixed in any suitable mixing machine. This admixture is then sheeted on a screen, dried, and compacted under heat and pressure in a manner similar to that described under Example I. The products resulting from this procedure are somewhat denser and stronger than those made in the manner indicated in Example I.

Products prepared as above have a specific gravity ranging from 1.2 to 1.35, a tensile strength of approximately 11,000 pounds per sq. in., a compressive strength perpendicular to the laminations of substantially 45,000 pounds per sq. in., and a dielectric strength of 30,000 to 35,000 volts per millimeter in sheets .04 inches in thickness. The product is superior in tensile strength and in dielectric strength to vulcanized fiber compositions now commonly used, and is a less expensive product to manufacture. It compares favorably with the expensive dielectric compositions made from phenol-aldehyde condensation products and may in many situations be substituted therefor.

The proportions of the fiber and of the shellac-like derivative of rubber in the above described compositions may be varied within rather wide limits. Thus, I have found that satisfactory compositions may contain as low as 25 percent and as high as 95 percent of fiber. The preferable range, however, I find to be from 60 to 85 percent of fiber and from 40 to 15 percent of the shellac-like rubber derivative.

I find that I may substitute for the spruce sulphite pulp of the above examples, either in whole or in part, straw, hay, waste papers, cotton linters, or sawdust. The products made with these substitute fibers or fillers are hard, firm and generally lighter in weight than the spruce pulp products.

I further find that in place of the shellac-like derivatives of rubber, above described, I may substitute in part shellac, jet rosin, mineral rubber, copal, etc. Thus, 5 parts of rubber latex or jet rosin may replace an equal amount of the shellac-like rubber derivative.

In preparing these fiber compositions under either of the processes of Examples I or II, I may add suitable pigments to effect a desired color in the resulting product. Thus, I may substitute for 10 parts by weight of the sulphite pulp in the above example, iron oxide to produce a red product, chrome green to produce a green product, ultramarine blue to produce a blue product, or carbon black to produce a black product.

Other variations of the fiber composition of the character herein indicated may be made without departing from the principle of this invention and I therefore do not desire to restrict the present application except as set forth in the appended claims or otherwise than necessitated by the prior art.

I claim:

1. The method of producing a composition of matter containing fibers and a hard, friable, thermoplastic derivative of rubber, which comprises separating individual fibers one from the other to a substantial degree, and surrounding the individual fibers with the thermoplastic material.

2. The method of producing a composition of matter containing fibers and a hard, friable, thermoplastic derivative of rubber, which comprises separating individual fibers one from the other to a substantial degree, surrounding the individual fibers with the thermoplastic material and compacting the composition by the application of heat and pressure.

3. The method which comprises mechanically comminuting in aqueous medium a shellac-like derivative of rubber, mixing fiber therewith, rough-forming and drying the mixture, and compacting said rough-formed materials by the application of heat and pressure.

4. The method which comprises preparing a hard, friable, thermoplastic derivative of rubber by the reaction with rubber of a sulfonic compound containing the grouping R—$SO_2$—X, in which R represents an organic radical or a hydroxy group and X represents a hydroxy group or chlorine, comminuting said rubber derivative, beating in water a fibrous material, intimately admixing in water said comminuted rubber derivative and said beaten fiber, rough-forming and drying said admixed materials, and compacting said rough-formed material by the application of heat and pressure.

5. A composition of matter which contains fibers and a shellac-like derivative of rubber and in which the individual fibers are separated in a substantial degree by surrounding films of the rubber derivative.

6. A composition of matter containing fibers and a shellac-like derivative of rubber produced by the reaction with rubber of a sulfonic compound containing the grouping R—$SO_2$—X, in which R represents an organic radical or a hydroxy group and X represents a hydroxy group or chlorine, and in which the individual fibers are separated in a substantial degree by surrounding films of the rubber derivative.

7. A composition of matter which contains a major proportion of fibers and a minor proportion of a shellac-like derivative of rubber.

8. A composition of matter which contains approximately 60 to 85 percent of fiber and 40 to 15 percent of a shellac-like derivative of rubber.

In witness whereof I have hereunto set my hand this 14th day of August, 1924.

HARLAN L. TRUMBULL.